UNITED STATES PATENT OFFICE.

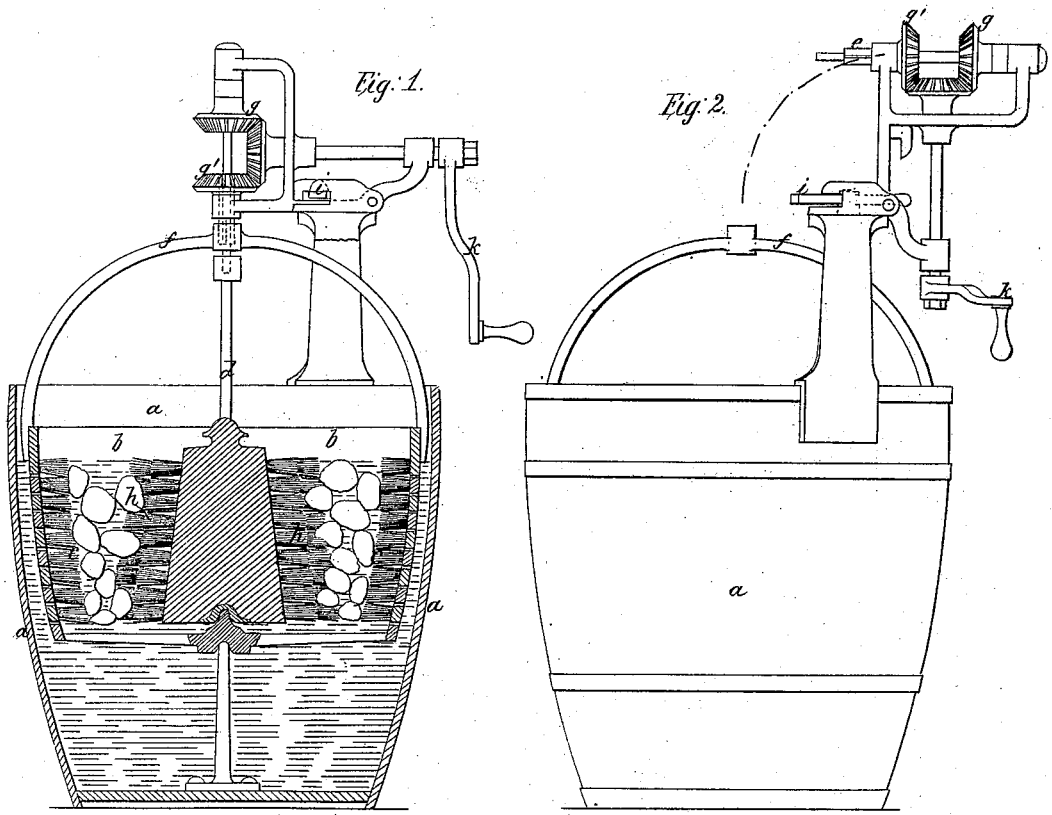

JOHN LAWTON, SAMUEL HIBBERT, AND JOHN RHODES, OF MANCHESTER, ENGLAND.

IMPROVED POTATO-WASHER.

Specification forming part of Letters Patent No. 40,631, dated November 17, 1863.

*To all whom it may concern:*

Be it known that we, JOHN LAWTON, SAMUEL HIBBERT, and JOSEPH RHODES, all of the city of Manchester, county of Lancaster, United Kingdom of Great Britain and Ireland, have invented certain Apparatus for Cleaning and Decorticating Potatoes, &c.; and we do hereby declare the following to be a full, clear, and exact description of the same, reference being had to the accompanying drawings, and to the letters of reference marked thereon.

The improvements consist in the employment and use of a double arrangement of rotating brushes, one portion thereof being placed upon a central shaft, and rotating in one direction, the other brushes being secured in a perforated cylinder encircling the central shaft, the bristles projecting toward each other, the cylinder being driven in an opposite direction to the shaft by means of bevel-gearing or other suitable mechanism. The arrangements of brushes are made to taper toward each other at the lower extremity, so that all sizes of roots will be acted upon, and the potatoes or other roots are placed in the space between the brushes, the action of which cleanses and removes the skin or exterior coating therefrom, the whole being inclosed in a vessel containing water.

In order to enable others to make and use our invention, we will proceed to describe its construction and operation.

On reference to the accompanying drawings, which form a part of this specification, Figure 1 represents a vertical section of the apparatus, showing the exterior vessel to contain water, and the interior perforated cylinder lined with brushes, and also the central rotating brush. This view also shows the vessel as when containing potatoes. Fig. 2 is an elevation of the same, showing the apparatus and gearing for driving the brushes as disconnected therefrom and turned back on the hinge to allow of the central brush and cylinder containing the potatoes being removed.

In Figs. 1 and 2, $a\,a$ is the exterior vessel, containing water, within which the perforated cylinder $l$, containing one set of brushes, $c$, is mounted on the central shaft, $d$. This cylinder of brushes is connected with the vertical driving-shaft $e$ by means of the arch or bow $f$, through which a square shoulder on the said shaft fits, and a rotary motion is thereby transmitted to it from the bevel-gearing $g\,g$, the upper wheel, $g$, being connected to the central brush, $h$, and giving it motion, the lower wheel, $g'$, driving the cylinder, and from such double-action gearing the brushes receive motion and rotate in opposite directions. The potatoes or roots are placed in the space between the brushes, and are submitted to their action until sufficiently cleaned, when, by turning the latch $i$, (which holds the hinge firm,) the shaft $e$ may be withdrawn from the brush $h$ and from the bow $f$, and thus leave the brush and cylinder at liberty for the removal of the roots, the driving apparatus being turned out of the way on the hinge.

We would remark that the tapering of the brushes accommodates the various sizes of potatoes or roots, and the apparatus may either be driven by the handle $k$ or by steam-power.

Having now described the nature of the said invention, together with the method of carrying the same into practical effect, we wish it to be distinctly understood that we claim—

The employment and use of a double arrangement of rotating brushes, revolving in opposite directions, and acting upon potatoes and other esculent roots, for the purpose of decorticating or cleaning them, as hereinbefore described, set forth, and fully illustrated in the drawings attached.

In testimony whereof we have set our names to this specification in the presence of two subscribing witnesses.

JOHN LAWTON.
SAMUEL HIBBERT.
JOSEPH RHODES.

Witnesses:
JAS. THOS. BOWERS,
12 *Park Street, Hulme.*
G. F. SATTON.
15 *Frederick Street, Lark Hill, Stockport.*